United States Patent [19]

Clatworthy et al.

[11] 4,416,316
[45] Nov. 22, 1983

[54] TIRE TREADS AND TIRES

[75] Inventors: Michael C. Clatworthy, Staffordshire; William P. S. Mack, Birmingham; Douglas J. Major, Sutton Coldfield, all of England

[73] Assignee: Dunlop Limited, London, England

[21] Appl. No.: 241,222

[22] Filed: Mar. 6, 1981

[30] Foreign Application Priority Data

Mar. 13, 1980 [GB] United Kingdom ................. 8008633

[51] Int. Cl.³ .............................................. B60C 11/10
[52] U.S. Cl. ................................................ 152/209 R
[58] Field of Search ............... 152/209 R, 209 D, 152, 152/330 RP, 330 A; D12/136, 140

[56] References Cited

U.S. PATENT DOCUMENTS

| Re. 30,518 | 2/1981 | French | 152/330 A |
|---|---|---|---|
| 2,006,197 | 6/1935 | Ewart et al. | 152/209 R |
| 3,861,436 | 1/1975 | Poque | 152/209 R |
| 3,926,238 | 12/1975 | Vorih | 152/209 R |
| 3,998,256 | 12/1976 | Verdier | 152/209 R |
| 4,226,274 | 10/1980 | Awaya et al. | 152/209 R |
| 4,262,724 | 4/1981 | Sarkissian | 152/330 RF |
| 4,337,813 | 7/1982 | Rach et al. | 152/209 R |

FOREIGN PATENT DOCUMENTS

| 2457334 | 6/1975 | Fed. Rep. of Germany ... 152/330 A |
|---|---|---|
| 2496562 | 6/1982 | France ............................ 152/209 D |
| 736068 | 11/1953 | United Kingdom . |
| 1489587 | 10/1974 | United Kingdom . |

Primary Examiner—Michael W. Ball
Attorney, Agent, or Firm—Stevens, Davis, Miller & Mosher

[57] ABSTRACT

A vehicle's spare tire can be made lighter and cheaper for economy, but this entails limited performance and shorter safe life. The invention provides a temporary spare tire with a tread which emits a distinctive two-tone or three-tone warning sound when in use to give audible warning of the need for early replacement.

The tread is structured to maximize highway noise, and is circumferentially divided into two or more parts, each at least one-sixth of the circumference and which contact the highway in sequence. Each part emits a particular different note or tone, so that different notes or tones sound in sequence as the vehicle moves. The preferred tread structure is a block pattern with a sinusoidally varying land/sea ratio to concentrate acoustic energy at a characteristic frequency within each circumferential part. The same tread pattern may be used around the whole tread, "stretched" into long-pitch lengths for low notes and "compressed" into short-pitch lengths for high notes.

8 Claims, 3 Drawing Figures

TIRE TREADS AND TIRES

This invention relates to tire treads and tires.

It is known that tires usually emit nosie when running on a paved surface, and steps are taken to minimize such noise by random variation of the pitch of the tread pattern around the circumference of the tread and usually also by designing the tread pattern itself to minimize noise.

A vehicle will normally carry a wheel-mounted spare tire to be subtituted for a normally used tire should the latter be punctured and become deflated or otherwise damaged so as to require replacement. Carrying a spare wheel and tire involves penalties in the form of the capital cost of the spare, extra load on the vehicle with consequent increase of fuel consumption, and some loss of load-carrying capacity of the vehicle. These penalties can be mitigated by a spare which utilizes a lighter and/or cheaper wheel, and a tire which is narrower than the normally employed tires and/or of cheaper construction. However, this will usually result in the spare wheel and tire having a reduced safe lifetime of usage, though the load bearing capacity and peak safe speed will in general have to be maintained equal to that of the normally-fitted wheel and tire. Therefore such a spare wheel and tire must be used only to the minimum extent necessary, i.e. until the punctured or damaged tire can be repaired and returned to use on the vehicle. To this end, the present invention proposes a form of tire tread and a tire incorporating such a tread for use as a temporary spare which will give a substantially continuous and distinctive warning, preferably an audible warning, to the vehicle user during vehicle movement, that the temporary spare is in use.

According to a first aspect of the present invention, a tire tread has mutually circumferentially displaced first and second circumferential parts each comprising at least one circumferentially continuous length circumferentially extending around at least one-sixth of the total circumference of the tread and each said part being formed of a regular tread pattern respectively having a first pitch of tread pattern repetition in said first part and a second pitch of tread pattern repetition in said second part.

The total circumferential lengths of said first and second circumferential parts preferably each amount to substantially one half of the total circumference of the tread.

Each of said first and second circumferential parts may be individually circumferentially sub-divided into two (or three) substantially equal-length sectors, sectors of the first part alternating around the tread with sectors of the second part whereby the tread is formed of quadrants (or substantially 60° sectors) of the first pitch length tread pattern sequentially alternating around the tread with quadrants (or substantially 60° sectors) of the second pitch length tread pattern.

Said first pitch length is preferably substantially twice as long as said second pitch length to generate respective tones or noises whose fundamentals differ by substantially one octave.

The tread may further include a third circumferential part comprising at least one circumferentially continuous length circumferentially extending around at least one-sixth of the total circumference of the tread and formed with a regular tread pattern having a third pitch of tread pattern repetition, said first, second and third pitches having mutually substantially different lengths.

The tread pattern is preferably substantially the same around the entire circumference of the tread with substantially identical transverse dimensions from pitch-to-pitch but with circumferential dimensions within each pitch in proportion to the circumferential length of that pitch.

The tread pattern is preferably such as to generate, in use, a tire tone or noise have a substantially sinusoidal waveform whereby to concentrate acoustic energy into a respective single frequency when any given one of said circumferential parts is in contact with the surface on which the vehicle is running and thereby to maximise the amplitude of generated tones or noises, the tread pattern detail preferably being such that the ratio of areas of portions of the tread normally contacting said surface to areas of non-contacting portions of the tread pattern varies along the circumference of the tread from one end to the other of a pitch of tread in a substantially sinusoidal manner, and the surface-contacting portions of the tread pattern may be shaped to have edges thereof substantially at right angles to the circumferential direction of the tread to maximise instantaneous impact of tread land on the road as the tire rotates thereon. The tread pattern may be laterally symmetrical about the cirucmferential centre line of the tread.

The tread of the first aspect of the invention may be a replacement tread band for a radial carcass tire of the type having replaceable treads, and in such a case the tread band preferably incorporates an undertread tread-reinforcing breaker. Alternatively, the tread of the first aspect of the invention may be a ready-patterned and pre-cured or partly pre-cured tread band for bonding onto a buffed-down tire carcass in a retreading process producing a "remould" tire.

According to a second aspect of the invention, there is provided a tire having a tread according to the first aspect of the invention. The tire of the second aspect of the invention may be a pneumatic tire of the radial type having a radial-ply carcass and an under-tread tread-reinforcing breaker, the tread being formed in the moulding and curing stage of the tire construction. Alternatively, the tire may be a cross-ply tire, or a belted-bias tire. As a further alternative, the tire may be a solid non-pneumatic tire. As a still further alternative, the tire may be of a type where the tread is supported by tensioned or compressed sidewalls, the tire of this type not requiring inflation for its normal operation.

An embodiment of the invention will now be described by way of example with reference to the accompanying drawings wherein.

Figure 1:
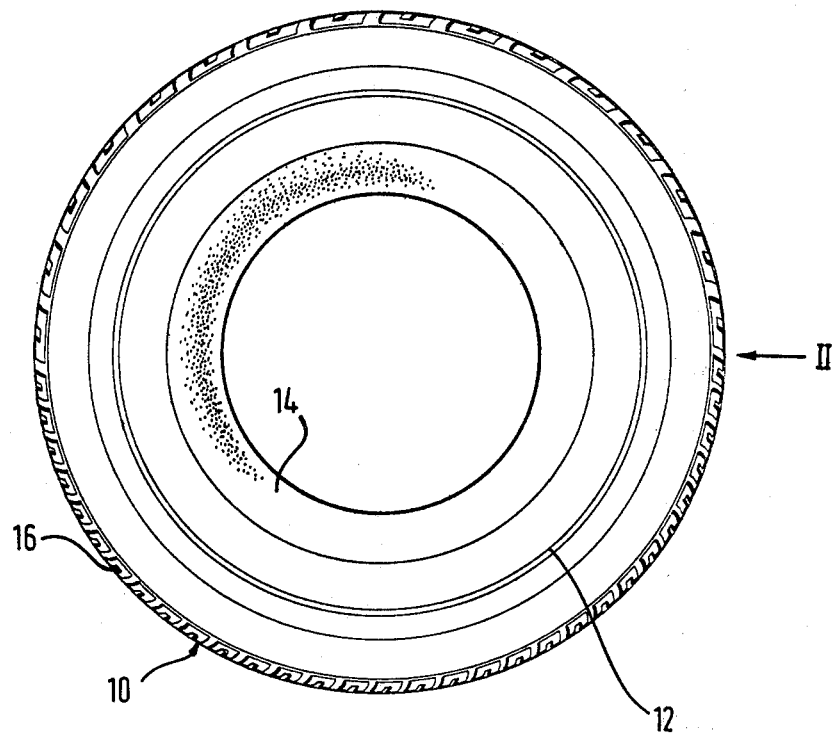
FIG. 1 is a view of a tire in accordance with the invention, along its axial direction.
Figure 2:
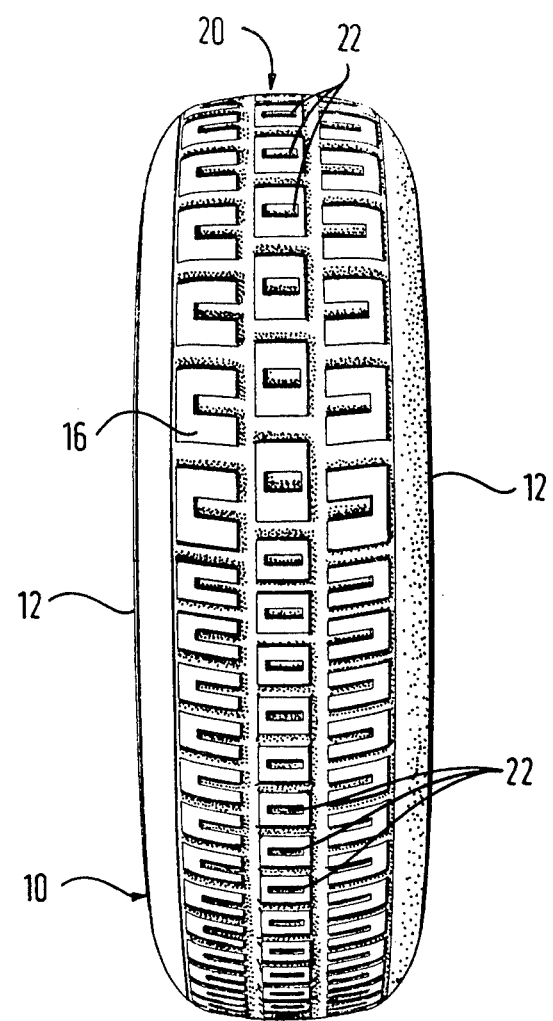
FIG. 2 is a view in the radial direction of the tire of FIG. 1, as viewed in the direction of the arrow II in FIG. 1.

Referring first to FIG. 1, a tire 10 has a conventional carcass (which may be of the radial ply type or the cross-ply type) including sidewalls 12 and beads 14 (only one sidewall 12 and one bead 14 being visible in FIG. 1). One edge of the tread 16 is visible in FIG. 1, and the tread will be seen to consist of a regular pattern (more readily apparent in FIG. 2). This pattern repeats with a relatively long pitch around a first circumferential part which is the upper half of the tread circumference as viewed in FIG. 1, and also repeats with a relatively short pitch around a second circumferential part which is the lower half of the tread circumference as viewed in FIG. 1. The longer pitch is twice the length of the shorter pitch. The regular tread pattern and its two pitches will be more readily seen by looking now at FIG. 2.

Figure 3:
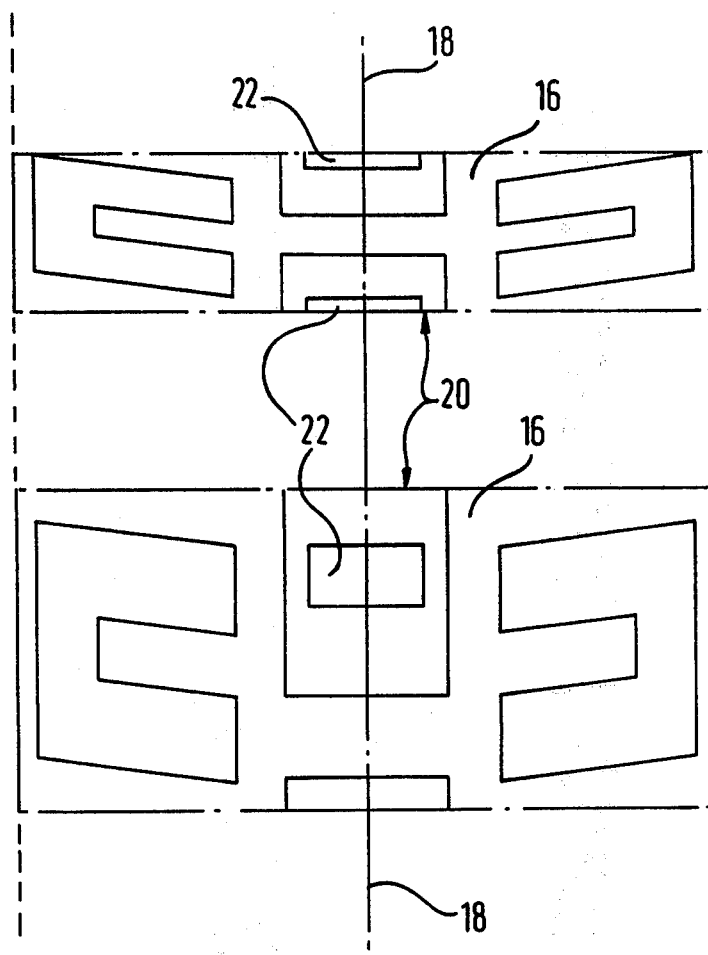
FIG. 3 is a plan view to an enlarged scale of a unit of tread pattern shown in each of its two pitch lengths.

A single pitch of the tread pattern in each of the pitch lengths is shown to an enlarged scale in FIG. 3. The upper illustration in FIG. 3 is of the short-pitch tread pattern, and the lower illustration is of the long-pitch tread pattern. The tread pattern can be summarized as a central row of tread blocks 20 having central recesses 22, and two lateral rows of skewed "U"-shaped tread blocks open towards the centre line 18. FIG. 3 shows that the transverse dimensions of the tread pattern are identical in both pitches, while the circumferential dimensions of the tread pattern differ by a constant factor of 2:1 between the long pitch and the short pitch, i.e. the circumferential dimensions of the tread pattern within any given pitch are in proportion to the circumferential length of that pitch. The tread pattern is laterally symmetrical about the circumferential centre line 18 of the tread 16, and the pattern is designed to produce noise having a substantially sinusoidal waveform in use so as to concentrate the noise energy into a respective single frequency in each of the short-pitch and long-pitch tread lengths, and thereby to maximize the amplitude of generated noise.

A closer examination of either pitch of tread pattern shown in FIG. 3 will show that progressing circumferentially from one end of the pitch to the other, (i.e. vertically as viewed in FIG. 3), at any transverse section of the tread, the ratio of the area of road-contacting tread (tread "land") to the area of non-road contacting tread between the tread land (i.e. the tread "sea") has a substantially sinusoidal function of the fractional distance of that transverse section along the pitch. The circumferential graduation of "land-to-sea" ratio effects a sinusoidally varying area of road contact and hence of the impact of leading edges of tread land with the road as the tire rotates, which is the principal source of tire noise in a block-pattern tread. The middle row of tread blocks 20 have centrally-formed rectangular pockets or recesses 22 to increase generation of noise at a fundamental frequency proportional to tread pitch length, as these blocks 20 contact a paved surface during rotation of the tire 10.

The particular tread pattern shown in FIG. 3 is merely one example which generally conforms to the above principle of sinusoidal noise generation, and numerous other patterns may be devised by persons skilled in the art of the tire tread design, in accordance with the above-described principles.

In use, the illustrated tire 10 will function as a temporary spare tire when mounted on a suitable wheel (not shown), and in such use, will generate a distinctive two-tone audible warning as the vehicle moves, due to the tread pattern in each half of the tread circumference generating its own distinctive tone when interacting with the surface on which the vehicle is running. The frequencies of the two tones will vary with the vehicle speed, but will always be one octave apart. It is believed that a two-tone audible warning noise is particularly noticeable, especially in a noisy environment.

The above-described temporary spare tire can be employed on any size and weight of vehicle, having any number of wheels; for example, the invention may be used on two and three-wheeled motor-cycles, three and four-wheeled cars, trucks and delivery vans, and larger passenger and/or freight vehicles with any number of wheels from four upwards.

Modifications and variations of the above-described embodiment may be made within the scope of the invention. For example, the circumferential lengths of the parts with different pitches may be unequal, and/or the circumference may be divided into more than two parts (but preferably into an even number of parts); in the case of a large tire such as a truck tire, the tread circumference may be divided by four or six into quadrants or 60° sectors (respectively) with the short-pitch tread pattern alternating with the long-pitch tread pattern in successive quadrants or 60° sectors. Thereby the two warning tones will repeat twice or three times per revolution of the tire and this doubled or tripled repetition rate of the tones will compensate for the lower rotational speed of a large tire for a given vehicle speed along a road to give a tone repetition rate nearer that of a relatively small diameter car tire constructed in the illustrated form. The pitch ratio need not be exactly 2:1 but could be greater or lesser according to desired relative tone frequencies. A tread pattern other than that illustrated could be employed if it generates a suitable noise in use.

As a further modification, the tread could be circumferentially divided into three parts (or six parts) of mutually equal or unequal lengths, and three mutually different tread-pattern pitch lengths employed to give a three-tone warning noise. The preferred upper limit on the number of different tread pattern pitch lengths and hence generated tones is three.

Having now described our invention what we claim is:

1. A tread for a temporary replacement tire for producing a deliberately audible alternating two note sound during normal running in unworn or partially worn condition of the tread, said tread comprising a tread pattern formed from the same material as the tread having two circumferentially displaced first and second circumferential parts, each extending approximately one half of the total tire circumference; each circumferential part comprising a regular tread pattern having at least one circumferentially extending row of tread blocks defined by grooves, some of the blocks having pockets in the tread pattern and spaced apart in the circumferential direction, the leading edges of said pockets being generally transverse to the direction of travel and the pockets being shaped as substantially closed geometric figures; the pitch of the first circumferential part being approximately twice that of the second circumferential part.

2. A tire according to claim 1, wherein the tread pattern is such as to generate, in use, a tire tone or noise having a substantially sinusoidal waveform whereby to concentrate acoustic energy into a respective single frequency when any given one of said circumferential parts is in contact with a highway surface on which the vehicle is running and thereby to maximise the amplitude of generated tones or noises.

3. A tire according to claim 2 wherein the tread pattern detail is such that the ratio of areas of portions of the tread normally contacting said highway surface to areas of non-contacting portions of the tread pattern varies along the circumference of the tread from one end to the other of a pitch of tread in a substantially sinusoidal manner.

4. A tire according to claim 3, wherein the surface-contacting portions of the tread pattern are shaped to have edges thereof substantially at right angles to the circumferential direction of the tread to maximize instantaneous impact of the highway surface-contacting portions on said highway surface as the tire rotates thereon.

5. A tire tread according to claim 1, wherein the tread pattern is laterally symmetrical about the circumferential centre line of the tread.

6. A tire according to claim 1, in the form of a pneumatic tire having a radial-ply carcass and an under-tread tread-reinforcing breaker.

7. A tire according to claim 1, in the form of a pneumatic tire having a cross-ply carcass.

8. A tire according to claim 1, in the form of a pneumatic tire having a belted-bias carcass.

* * * * *